| (12) | United States Patent | (10) Patent No.: US 10,614,154 B2 |
|---|---|---|
| | Gao et al. | (45) Date of Patent: Apr. 7, 2020 |

(54) METHODS, DEVICES, AND COMPUTER-READABLE MEDIUM FOR PREDICTING THE INTENDED INPUT FROM A USER OF AN APPLICATION IN AN ELECTRONIC DEVICE

(71) Applicant: Xiaomi Inc., Beijing (CN)

(72) Inventors: Yi Gao, Beijing (CN); Hongqiang Wang, Beijing (CN); Yunyuan Ge, Beijing (CN)

(73) Assignee: XIAOMI INC., Beijing (CN)

( * ) Notice: Subject to any disclaimer, the term of this patent is extended or adjusted under 35 U.S.C. 154(b) by 470 days.

(21) Appl. No.: 15/340,420

(22) Filed: Nov. 1, 2016

(65) Prior Publication Data

US 2017/0147538 A1  May 25, 2017

(30) Foreign Application Priority Data

Nov. 23, 2015 (CN) .......................... 2015 1 0819054

(51) Int. Cl.
  *G06F 16/28* (2019.01)
  *G06F 16/24* (2019.01)
  (Continued)

(52) U.S. Cl.
  CPC .......... *G06F 17/2223* (2013.01); *G06F 3/018* (2013.01); *G06F 3/0237* (2013.01);
  (Continued)

(58) Field of Classification Search
  None
  See application file for complete search history.

(56) References Cited

U.S. PATENT DOCUMENTS 6,864,809 B2 *  3/2005  O'Dell .................. G06K 9/222
                                                         341/20
7,385,591 B2 *  6/2008  Goodman ............. G06F 3/0237
                                                         341/22
(Continued)

FOREIGN PATENT DOCUMENTS

CN          102646022 A       8/2012
CN          103076892 A       5/2013
(Continued)

OTHER PUBLICATIONS

Office Action dated Aug. 18, 2017 for Chinese Application No. 201510819054.5, 7 pages.
(Continued)

*Primary Examiner* — Uyen T Le
(74) *Attorney, Agent, or Firm* — Brinks Gilson & Lione

(57) ABSTRACT

A method for processing input from a user of an application in an electronic device includes: obtaining a first sequence of one or more key presses typed by the user of the application in the electronic device as a representation of an intended input content, obtaining a second sequence of one or more key presses as a representation of a context content of the application under the input coding scheme, identifying a subsequence in the second sequence that matches or closely matches the first sequence, and displaying on a display screen of the electronic device at least a portion of the context content corresponding to the identified subsequence in the second sequence as a candidate for the intended input content.

14 Claims, 10 Drawing Sheets

(51) Int. Cl.
*G06F 17/22* (2006.01)
*G06F 3/01* (2006.01)
*G06F 17/27* (2006.01)
*G06F 3/023* (2006.01)
*G06F 3/0489* (2013.01)
*G06K 9/72* (2006.01)

(52) U.S. Cl.
CPC ........ *G06F 3/04895* (2013.01); *G06F 17/276* (2013.01); *G06K 9/72* (2013.01); *G06K 2209/013* (2013.01)

(56) References Cited

U.S. PATENT DOCUMENTS

| | | | |
|---|---|---|---|
| 8,299,943 B2* | 10/2012 | Longe | G06F 3/0237 341/20 |
| 8,666,742 B2* | 3/2014 | Detlef | G10L 15/26 704/235 |
| 2004/0030543 A1 | 12/2004 | Kida et al. | |
| 2006/0217965 A1 | 9/2006 | Babu | |
| 2006/0247915 A1 | 11/2006 | Bradford et al. | |
| 2008/0235003 A1* | 9/2008 | Lai | G06F 3/018 704/8 |
| 2009/0249198 A1 | 10/2009 | Davis et al. | |
| 2010/0100568 A1 | 4/2010 | Papin et al. | |
| 2010/0317371 A1 | 12/2010 | Westerinen et al. | |
| 2014/0026043 A1 | 1/2014 | Takeuchi | |
| 2015/0234799 A1 | 8/2015 | Cho et al. | |
| 2017/0046330 A1* | 2/2017 | Si | G06F 17/30 |
| 2017/0068448 A1* | 3/2017 | Ghassabian | G06F 3/04883 |

FOREIGN PATENT DOCUMENTS

| | | |
|---|---|---|
| CN | 104298429 A | 1/2015 |
| CN | 104317851 A | 1/2015 |
| CN | 104508604 A | 4/2015 |
| CN | 104850241 A | 8/2015 |
| JP | 2007-114932 A | 5/2007 |
| KR | 10-2007-0043673 A | 4/2007 |
| KR | 10-2009-0127936 A | 12/2009 |
| KR | 10-2015-0123857 A | 11/2015 |
| RU | 2 424 547 C2 | 7/2011 |
| WO | WO 2014/032265 A1 | 3/2014 |

OTHER PUBLICATIONS

Extended European Search Report dated Apr. 3, 2017 for European Application No. 16194451.7, 7 pages.
Final Office Action dated Apr. 19, 2017 for Russian Application No. 2016110395/08, 11 pages.
Office Action dated Nov. 16, 2016 for Korean Application No. 10-2016-7005599, 9 pages.
International Search Report and Written Opinion dated Aug. 26, 2016 for PCT Application No. PCT/CN2015/099308 (12 pp.).
Examination Report dated Feb. 12, 2018 for European Application No. 16194451.7, 7 pages.
Office Action dated Mar. 6, 2018 for Japanese Application No. 2017-552213, 4 pages.

* cited by examiner

Fig. 1B
Fig. 1C
Fig. 1D
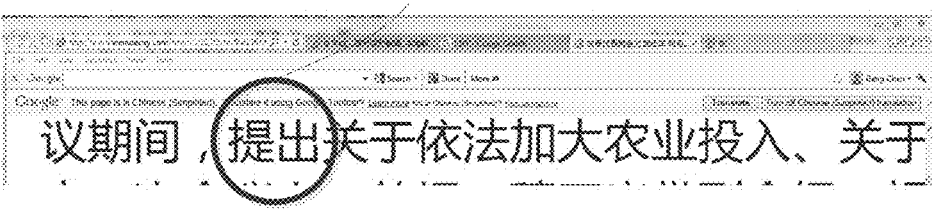
Fig. 1E
Yiqijian tichu guanyuyifajiadanongyetouru, guanyu

METHODS, DEVICES, AND COMPUTER-READABLE MEDIUM FOR PREDICTING THE INTENDED INPUT FROM A USER OF AN APPLICATION IN AN ELECTRONIC DEVICE

CROSS-REFERENCE TO RELATED APPLICATION

This application is based upon and claims priority to Chinese Patent Application No. 201510819054.5, filed Nov. 23, 2015, the disclosure of which is incorporated herein by reference in its entirety.

TECHNICAL FIELD

The present disclosure relates to the field of mobile communication technology, and more particularly to a method, device and computer-readable medium for input processing.

BACKGROUND

Some languages such as hieroglyphics are not based on alphabets. Coding schemes for inputting hieroglyphic symbols into an electronic device have been developed for some of these languages based on key presses on a normal qwerty keyboard. For some coding schemes, each linguistic symbol is uniquely coded into a sequence of key presses. However, for some languages and coding schemes, multiple different symbols or collections of symbols (phrases) may be coded as the same sequence of key presses. Thus, when a user types in a sequence of key presses, additional manual selection of the intended symbols or phrases by the user from all possible candidate symbols or phrases may be involved, leading to slow input process and poor user experience. The context of the application seeking input may be closely related to the input content and thus may be utilized to facilitate predicting intended symbols or phrases.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method for inputting intended content coded in a sequence of key presses by a user of an application running on an electronic device is disclosed. The method includes: obtaining a first sequence of one or more key presses typed by the user of the application in the electronic device as a representation of an intended input content, obtaining a second sequence of one or more key presses as a representation of a context content of the application, identifying a subsequence in the second sequence that matches or closely matches the first sequence, and displaying on a display screen of the electronic device at least a portion of the context content corresponding to the identified subsequence in the second sequence as a candidate for the intended input content.

In another embodiment, an electronic device for inputting intended content coded in a sequence of key presses by a user of an application running on the electronic device is disclosed. The electronic device includes a processor and a memory for storing processor-executable instructions, wherein the processor is configured to: obtain a first sequence of one or more key presses typed by a user of an application in the electronic device as a representation of an intended input content, obtain a second sequence of one or more key presses as a representation of a context content of the application, identify a subsequence in the second sequence that matches or closely matches the first sequence, and display on a display screen of the electronic device at least a portion of the context content corresponding to the identified subsequence in the second sequence as a candidate for the intended input content.

In yet another embodiment, a non-transitory computer-readable storage medium having instructions stored therein is disclosed. The instructions, when executed by one or more processors, causing an electronic device to obtain a first sequence of one or more key presses typed by a user of an application in the electronic device as a representation of an intended input content, obtain a second sequence of one or more key presses as a representation of a context content of the application, identify a subsequence in the second sequence that matches or closely matches the first sequence, and display on a display screen of the electronic device at least a portion of the context content corresponding to the identified subsequence in the second sequence as a candidate for the intended input content.

BRIEF DESCRIPTION OF THE DRAWINGS

The accompanying drawings herein, which are incorporated in the specification and constitute a part thereof, illustrate embodiments consistent with the present disclosure, and serve to explain the principles of the present disclosure together with the specification.

FIGS. 1B-1E illustrate exemplary interfaces of the method of FIG. 1A.

DETAILED DESCRIPTION

Figure 1A:
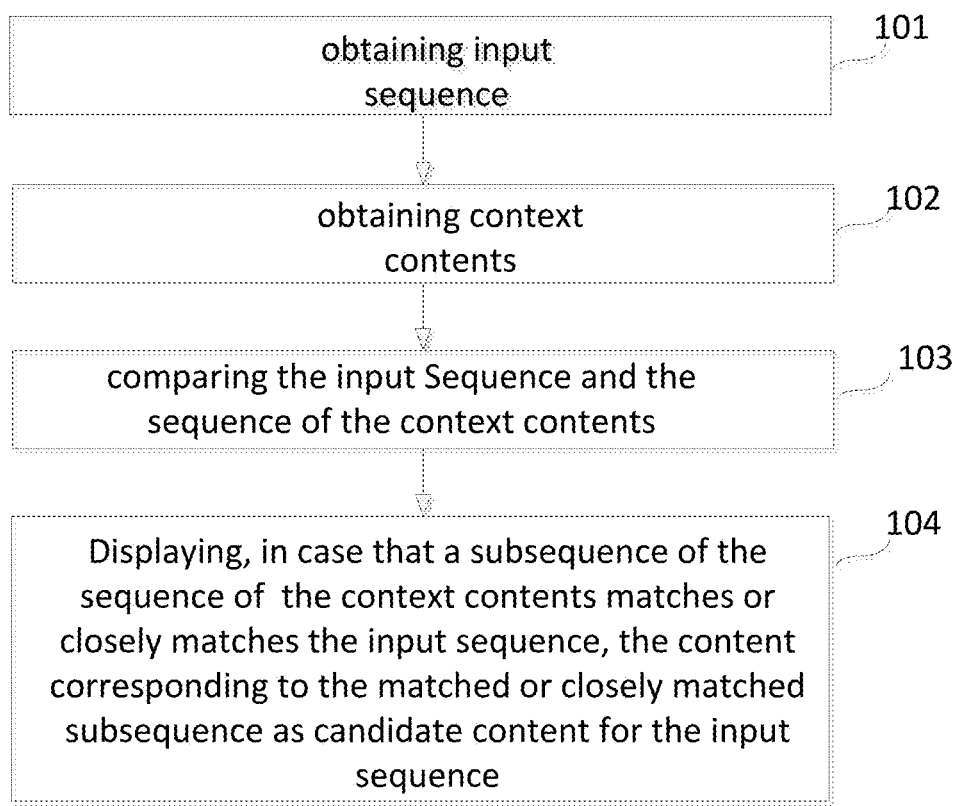
FIG. 1A is a flow diagram illustrating a method for inputting coded content according to an exemplary embodiment.

Reference will now be made in detail to exemplary embodiments, whose examples are illustrated in the accompanying drawings. When refereeing to the accompanying drawings, the same reference number in different drawings refers to same or similar elements, unless otherwise indicated. The implementations set forth in the following exemplary embodiments do not represent all implementations consistent with the present disclosure. Instead, they are merely examples of apparatuses and methods consistent with aspects related to the disclosure as recited in the appended claims.

Terminologies used in the present disclosure are only for the purpose of describing particular embodiments, and are not intended to be limiting. The singular form "a", "an", "said" and "the" used in the disclosure and the appended claims are intended to comprise plural form, unless the context clearly indicates otherwise. It should also be understood that the terminology "and/or" used herein means comprising any or all possible combinations of one or more of the associated listed items.

It should be understood that, although the terms first, second, third, etc., may be employed in the present disclosure to describe various information, but the information should not be limited to these terms. These terms are only used to distinguish one type of information from another. For example, the first information may also be referred to as second information without departing from the scope of the present disclosure. Similarly, the second information may also be referred to as first information. Depending on the context, the word "if" as used herein may be interpreted as "when" or "in case that" or "in response to determining."

By way of introduction, some languages such as hieroglyphics are not based on alphabets. For example, the basic linguistic unit of Chinese is a symbol. Each Chinese symbol may be a combination of one or more strokes. A Chinese symbol may contain as few as one stroke or may contain as many as 30 or more strokes. There are numerous types of strokes. Some Chinese symbols may function like English words, representing specific objects or abstract ideas. Sometimes a Chinese symbol may need to be placed into a context, i.e., in combination with other Chinese symbols, to have specific meaning. Combinations of Chinese symbols are referred to as phrases. Thus, Chinese strokes are approximately analogous to English alphabets. A Chinese symbol may be analogous to an English word. But sometimes, a Chinese symbol may be analogous to a portion of an English word, such as a root in an English word and a combination of Chinese symbols (Chinese phrase) may be analogous to an English word.

Thus, strokes may be used as basic unit for typing Chinese into a computer. However, the Chinese strokes are more numerous than English alphabets. In addition, the strokes in a Chinese symbol are arranged in two dimensions, as opposed to the one-dimensional arrangement of a linear sequence of alphabets in an English word. These characteristics present great challenges in designing a Chinese-specific keyboard. Instead, Chinese symbols may be typed into an electronic device from a normal alphabet qwerty keyboard. Ideally, each Chinese symbol may be uniquely identified or input into the electronic device by a limited number of key presses. There are various coding schemes that are developed to map sequences of key presses to Chinese symbols. Some of these schemes are based on spatial composition of Chinese strokes, such as the elaborate input scheme of Wubi and stroke count. Some other easier-to-learn schemes are based on phonetics in which each Chinese symbol is uniquely mapped to a sequence of alphabetic letters that approximately emulate the phonetics of the Chinese symbol. Examples of phonetic coding schemes include Pinyin. But because many different Chinese symbols may have the same sound, the reverse mapping of an alphabetic sequence to Chinese symbols is not unique. Thus, when an alphabetic sequence for an intended Chinese symbol is typed into the electronic device, the Chinese input application may list the multiple candidate symbols in an order based on, for example, average use frequency. The user may then select the intended symbol from the list.

In a typical electronic device having an operating system, such as a mobile phone and a laptop computer, various applications may be run. For example, an email application may be run and used by a user to manage email and a web browser application may be run for accessing the Internet. Many of these applications may need input from the user and the user may desire to input Chinese symbols. Thus, these applications may interact with a Chinese input program with an input window that the user may make key presses to input Chinese symbols using whichever input scheme of her choice. The user may return to alphabetic input by a mode switching or by quitting the Chinese input program.

In some situations, the user may desire to type in phonetics of a combination of Chinese symbols, or a Chinese phrase. Because a combination phonetics is more definitively (although still not uniquely) corresponding to a specific Chinese phrase, the input application may only need to provide a short list of possibilities to present to the user for selection. In some situations, the input application may guess what the phrase is and may even expand on the phrase by anticipating a larger phrase that may be intended by the user. In such a way, the user may need not to type the rest of the phonetics of the intended larger phrase (analogous to autocomplete in typing English phrases). But sometimes, the phrase intended by the user may not be a common phrase and the input application may not have in listed in its vocabulary bank and thus may not be able to guess what the Chinese phrases are even though the uncommon phrase may have been used and typed out previously on the basis of typing out each individual symbol in the phrase one at a time.

The embodiments disclosed below provide a context-based input mechanism for coded contents. For example, the context contents in the application seeking input from the user are highly relevant and may be consulted. The symbols/phrases intended by the user may be among the context contents. Those symbols and phrases would have the same coded sequence between the context contents and the input content sequence. Thus, the symbols/phrases in the context contents having a coded sequence (e.g., in phonetics) matching or closely matching the input coded sequence may be deemed as an initial guess of symbols/phrases intended by the user.

Those of ordinary skill in the art understand that the Chinese phonetic input system described above is only for illustrative purposes. The description above applies to other Chinese input systems. In addition, the description may apply to other hieroglyphic language input systems in similar fashion. Further, the context-based input processing disclosed herein may apply to input systems for any other languages, including non-coded languages, e.g., the English language. Thus, auto-completion for inputting English may be modified to include the context contents. For example, an English alphabetic input may be "atte". If the present context contents contain a sequence of letters that matches or approximates "atte", that sequence of letters may be used as initial guess of the input intended by the user and suggested to the user. For example, the context contents may contain the letter sequence "attempt". The word "attempt" may thus be displayed to the user as a suggested input. This suggestion may take priority over the other possible words in the vocabulary, such as "attend", "attendance", "attendant", and "attention". In the case that more than one letter sequence in the context contents matches or closely matches the typed letter sequence, these one or more letter sequences in the context contents may be ranked in accordance with various criteria, such as degree of similarity to the input sequence, and frequency of use in the context contents. The highest ranked sequence may be suggested to the user. Alternatively, multiple suggestions may be presented to the user in ranking order for user selection. The context-based input mechanism described above is not limited to language input. It may be applicable to other coded or non-coded input systems.

FIG. 1A is a flow diagram illustrating a method for input based on context contents according to an exemplary embodiment. The method may be used in a terminal, such as a mobile phone, a laptop computer, and the like. In step 101, input content that may be coded or non-coded sequence of key presses is obtained. The input sequence may be entered in an input box by a user. The entered sequence may, for example, be transmitted by another input program to the application seeking input on the input program's initiative or may be obtained by the application on its own initiative. Input sequence typed in the input box by a user may be based on non-coded key presses or may be based on various coding schemes, such as Pinyin, Wubi, or Stroke count for Chinese. That is, the present disclosure can be applied to non-coded input or coded input based on various input coding schemes.

In step 102, context contents are obtained. In one implementation, an application seeking input may obtain context contents from the application. For example, the context contents may be obtained from within the current interface of the application. Context contents may alternatively be obtained from the current interface and the previously displayed neighboring interfaces of the application. Further, context contents may be obtained from all historical interfaces displayed by the application. In addition, context contents may be obtained from outside the application interface displayed on the display screen of the electronic device. For example, the application may be a text editing tool. The application interface may only show partial text of a large document being edited. The context contents in this case may include the entire document, or the neighboring pages of the currently displayed page in the document. The present disclosure makes no limitation on the range of information content that may be obtained from the application as context contents. The context contents may be previous inputs previously made by the user into the application. The context contents may also include other texts in the application. For example, the user may be editing an email. Her previous inputs as edited as well as any content in the document being edited may be part of the context contents.

In step 103, the input content and the context contents are compared directly if there are no coding scheme involved, and under the same input coding scheme if the input and context contents are coded. For the latter, some conversion of either the input sequence or the context contents may need to be performed prior to the comparison. For example, if the input content is a coded Chinese phonetic Pinyin sequence, the context contents may be converted to Pinyin and that conversion would be definitive as discussed above. For another example, if the input content is of Wubi input sequence or Stroke count input sequence, the contents in the context contents are correspondingly converted to Wubi or Stroke count sequence. The comparison of the input sequence and the context contents directly for non-coded input and context content or under the same input coding scheme for coded input sequence may produce an exact match. An exact match occurs when the same sequence (e.g., non-coded sequence, Pinyin sequence, Wubi, or Stroke count sequence) of the input sequence is found in the sequence of the context contents (as a subsequence of the converted sequence for the context content, for example). The comparison may alternatively produce a close match even if there is no exact match. The threshold for close match may be predefined. For example, close match may be defined as finding a subsequence in the converted sequence of context contents that is more than 80% similar to the input sequence.

In step 104, the content in the context content corresponding to the matched or closely matched subsequence is displayed as candidate input symbols or phrases. Specifically for Chinese symbol or phrase input discussed above, the subsequence of the converted sequence of the context contents that is a match or close match to the input sequence may be converted back to Chinese symbols or phrases. Because reverse conversion may not be unique, the matched subsequence may be converted back to the Chinese symbols or phrases according to the content in the context contents that correspond to the subsequence. These symbols or phrases are deemed to be associated content corresponding to the input sequence and thus are provided and displayed to the user as candidate input symbols or phrases intended by the user by typing the input sequence in, for example, Pinyin, Wubi, or stroke count for Chinese.

In the implementation above, steps 101 and 102 are not necessarily sequential; the context contents may be obtained firstly, and then the input coded sequence may be obtained. Alternatively, the context contents and the input coded sequence may be obtained simultaneously.

Further in step 104, the corresponding content in the context contents of the matched or closely matched subsequence may also be added to a vocabulary bank of the input program such that the symbols or phrases associated with the matched or closely matched subsequence may be displayed the next time the input sequence is typed without having to perform step 103 and 104. The above steps may be processed by either the application or the input method program or a combination thereof. For example, the steps of FIG. 1A may be implemented as obtaining, by the application, input sequence from the input program, and obtaining the context contents of the application itself; comparing, by the application, the input sequence and the context contents under the same input coding scheme for matches or close matches; and displaying, by the application, content corresponding to matched or closed matched subsequence as candidate input symbols or phrases intended by the user. In this implementation, the application may invoke and communicate with the input program to obtain necessary information for the coding scheme and perform the steps above based on user input, the context contents, and the information obtained from the input program. Alternatively, the steps of FIG. 1A may be implemented as obtaining, by the input program, input sequence thereof and obtaining by the input program the context contents from the application; comparing, by the input program, the input sequence and the context contents under the same input coding scheme for matches or close matches; and displaying, by the input program, content corresponding to matched or closed matched subsequence as candidate input symbols or phrases intended by the user.

Thus, in the implementation of FIG. 1A, context contents are compared to an input sequence of an input box under the same input coding scheme for matches or close matches. If coded subsequence corresponding to portion of the context contents matches or closely matches the input sequence, the content in the context content corresponding the matched subsequence will be displayed as candidate input symbols or phrases. In such a way, content corresponding to the input sequence and intended by the user may be predicted and provided to the user in a quick manner, improving user experience and input speed.

FIGS. 1B-1E illustrates an example showing how the method of FIG. 1A is implemented. A user may work with a web browser, as illustrated by FIG. 1B. The user may attempt to search the internet by typing in coded sequence for a Chinese phrase in the search box (herein referred to as the first sequence). For example, the user may type a Pinyin sequence "tichu", as shown by 120. The user may alternatively type in "ticha" which is an approximate version of "tichu", as shown by 122 of FIG. 1C. The web browser already has some context contents in the current display interface, as shown by 124 of FIG. 1D. Upon receiving the user input sequence 120 or 122 (the first sequence). The input program and the web browser interact with each other to acquire the context contents of the browser 124. The context content 124 may then be converted to Pinyin sequence (herein referred as second sequence), as shown in 126 of FIG. 1E. Alternatively, the Pinyin sequence for the context contents may be created and kept in memory as the context contents is being generated. The browser application or the input program then proceeds to compare the input sequence 120 or 122 with the converted coded sequence of the context content 126 and search for a match or close match for "tichu" or "ticha". In this case, a match is found for "tichu" as shown by 128 of FIG. 1E. If the input sequence is "ticha" and the close match threshold is set at, e.g., 70%, then a close match is found as "tichu" (at match percentage of 4 out of 5 letters, or 80%). Alternatively, the Pinyin sequence in the context contents that matches the input sequence the closest may be identified. The matched or closely matched part 128 of the sequence 126 is herein referred as matched or closely matched subsequence of 126. The content 130 in the context contents 124 is the corresponding Chinese phrases associated with the matched or closely matched subsequence 128 ("tichu"). The Chinese phrase 130 is then deemed as a candidate for the phrase intended by the user. It will be displayed to the user as the first candidate together with other possible candidates according to the vocabulary of the input program. Optionally, this candidate, if not previously in the vocabulary of the input program, is added to the vocabulary as a candidate of Chinese phrase for the input sequence "tichu" or "ticha".

Figure 1F:
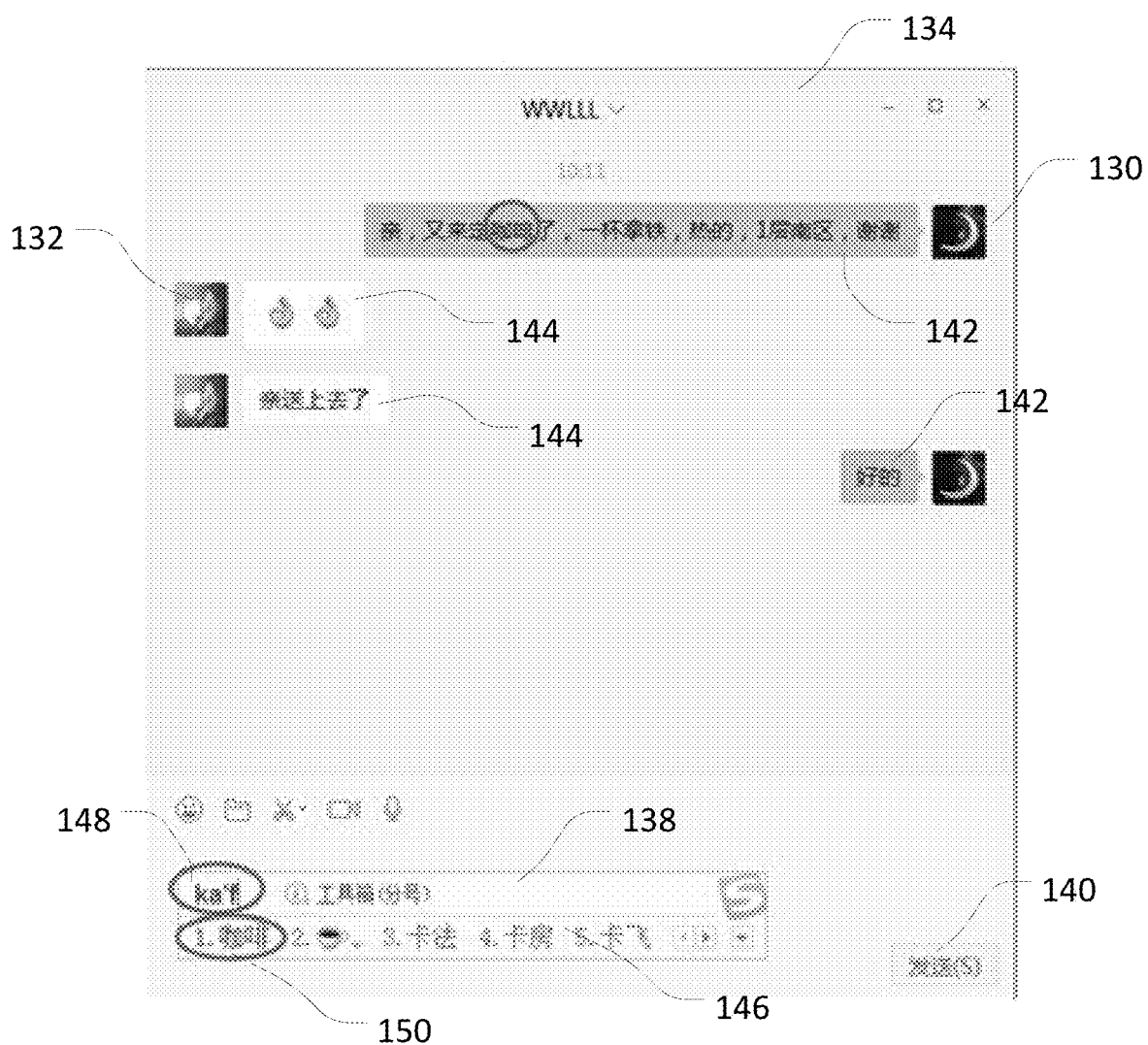
FIGS. 1F-1G illustrate an example for inputting Chinese in WeChat.
Figure 1G:
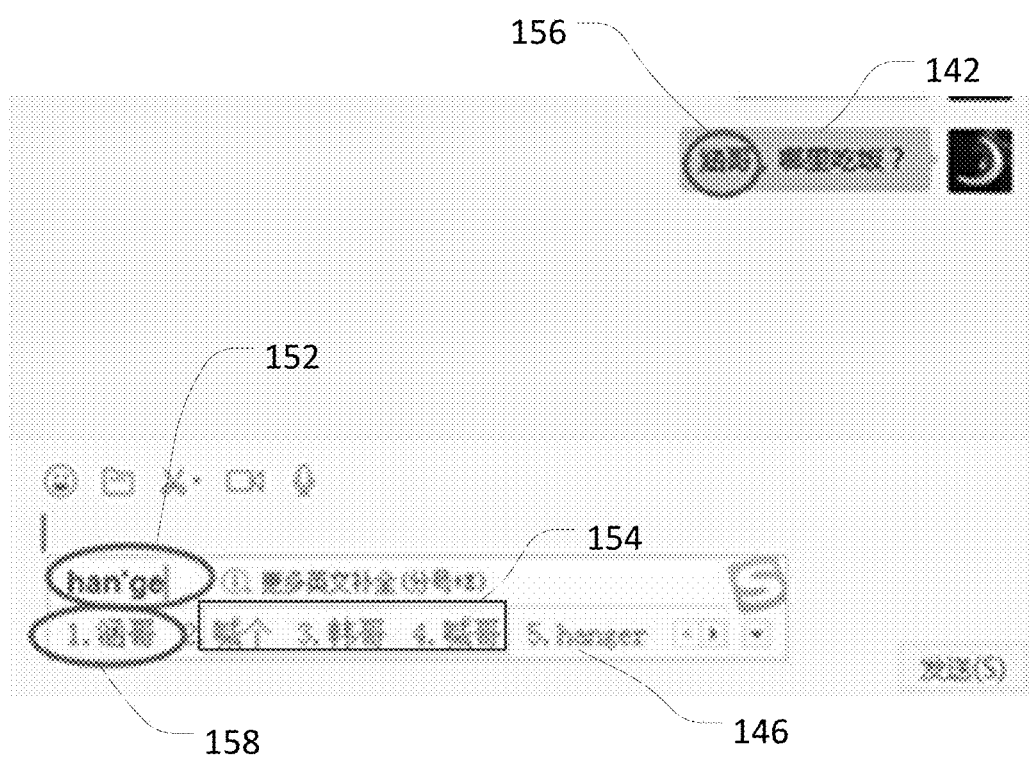

FIGS. 1F-1G provide another example for the implementation described above. In this example, the application accepting user input may be the WeChat application developed by Tencent, Inc. The WeChat application, for example, provides a social networking platform for friends to chat with each other. In FIG. 1F, user A, represented by icon 130, has installed the WeChat application on his mobile phone. The WeChat interface, running on the mobile phone of user A, is shown by 134. User A may type chat messages in the input box 138 of his WeChat interface and may click the "send" button 140 for sending the typed message. The messages sent by user A may show up as chat items such as 142. Messages 144 from another user 132 of WeChat with whom user A is chatting with are also displayed in the WeChat interface 134. User A may type coded sequences for Chinese phrases into the input box 138. The WeChat application may communicate with a Chinese input program to display candidate Chinese phrases in 146 corresponding to the coded sequence 148 typed by user A into the input box 138. Contents of existing messages such as 142 and 144 may be considered context contents. The user may type in Pinyin sequence "ka'f", 148, intending to input Chinese phrase for "咖啡" (coffee). The sequence "ka'f" has not appeared in the corresponding Pinyin sequence of the context content 142 and 144. The sequence "ka'f", however, may correspond to entries in the vocabulary of the input program. One of the entries may be the Chinese phrase "咖啡" (coffee). There may also be other entries of Chinese phrases that have Pinyin sequence similar to "ka'f". WeChat thus displays these Chinese phrases as a list of candidates for what the user intend to input, as shown by 146. The Chinese phrase 咖啡" (coffee) may be the first in the list of candidates because, for example, it is a more frequently used phrases compared to other candidates. This is shown by 150 in FIG. 1F.

As shown in FIG. 1G, the user may alternatively input the Pinyin sequence "han'ge" (or "hange", or "han ge", "han'ge" is taken as an example here) in the input box, as shown by 152. The vocabulary of the input program may contain entries of Chinese phrases that correspond to Pinyin sequence that is similar to "han'ge", such as "喊个", "韩哥", "喊哥", or even "焊割", as shown by portion 154 of the candidate list 146. The Chinese phrase "涵哥" also corresponds to a Pinyin sequence of "han'ge" but it is not a normal phrase and thus does not appear in the vocabulary of the input program. However, it appears in the context contents 142, as shown by 156. According to the implementation described above, WeChat and the input program interact with each other to identify that "han'ge" is part of the Pinyin sequence corresponds to the context content 142. As a result, the corresponding Chinese phrase from the context content "涵哥" is also listed in the candidate list 146. For example, because it appears in the context contents, it may be listed as the first choice, taking priority over other phrases 154 from the vocabulary of the input program. This is shown by 158. Further, the Chinese phrase "涵哥" may then be added to the vocabulary of the input program so that next time the Pinyin sequence "Han'ge" or similar sequences are input by the user, "涵哥" may be listed as a candidate even if it is not in the context contents.

The examples above apply to input of non-coded sequences as well. In those situations, the general principles operate the same way except that no correspondence between coded phrases and coding sequences is necessary.

Figure 2:
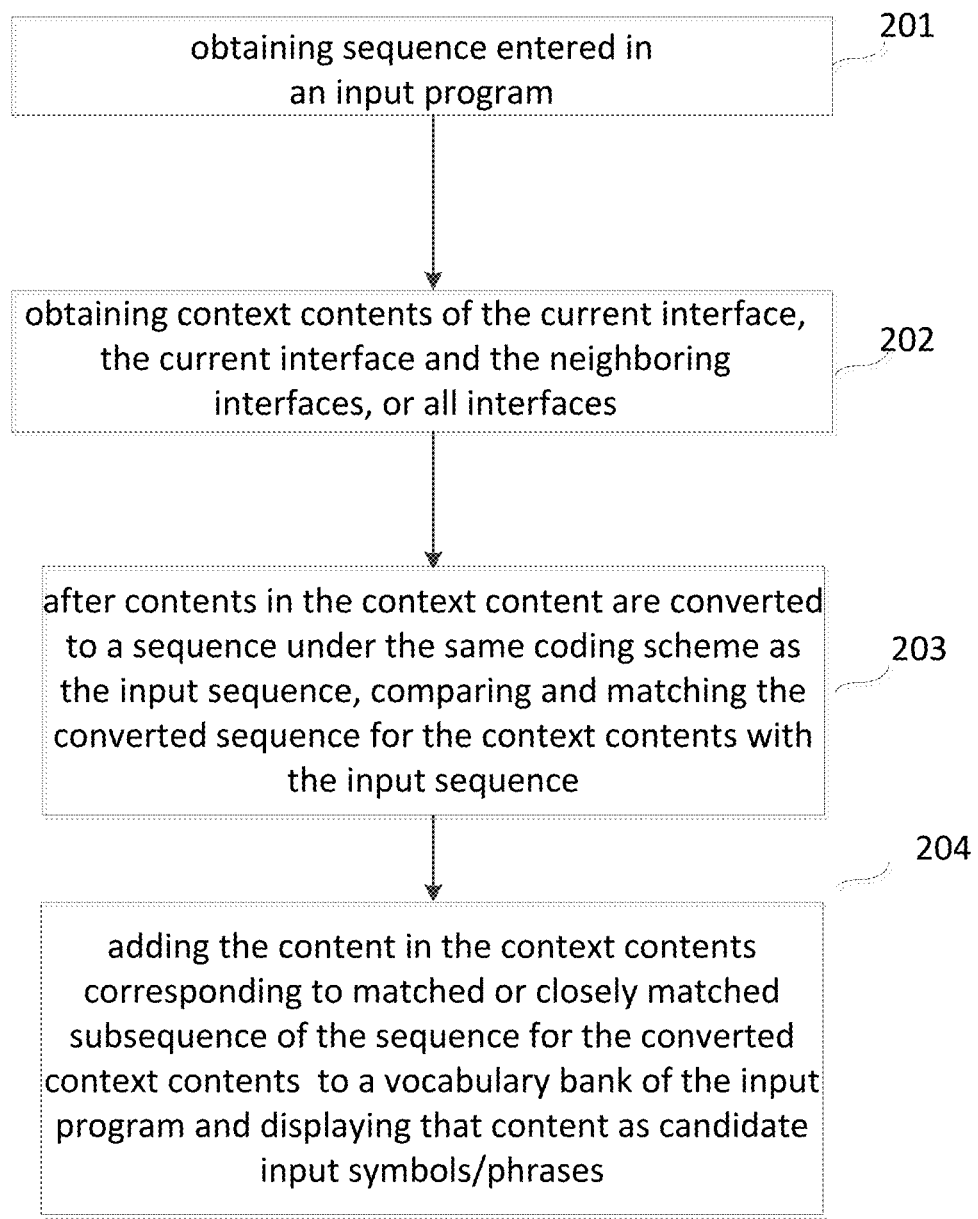
FIG. 2 is a flow diagram illustrating another method for inputting coded content according to an exemplary embodiment.

FIG. 2 is a flow diagram illustrating another method for inputting sequence according to an exemplary embodiment. This method may be used in an electronic device such as a terminal. While this method is applicable to either coded or non-coded input sequences, the description below uses coded input sequence for illustration purposes. In step 201, a coded sequence corresponding to some symbols or phrases intended by a user and entered in an input program is obtained. The input coding scheme used by the input program, for example and without limitation, may be Pinyin, Wubi, or Stroke count for Chinese symbols. The input sequence entered in the input box by the user based on one of the input coding schemes may be communicated by the input program on its initiative to the application seeking input. Alternatively, the application may obtain the input sequence on its initiative from the input program.

In step 202, context contents of one or more of the current interface of the application or the neighboring interfaces of the application are obtained. The range of context contents to be obtained may be selected according to various needs.

That is, an application may obtain context contents from its currently displayed interface. Context contents may be obtained from previously displayed interfaces of the application. Context contents may further be obtained from outside currently or previously displayed interfaces of the application. For example, context contents may include an entire document opened by the application even though only portions of the documents have been displayed in the current or previous interfaces of the application. Context contents may include any combination of the interfaces discussed above.

In step 203, after the context contents are converted into a coded sequence according to the input coding scheme, the converted sequence of the context contents is compared to the input coded sequence. For example, context contents may be converted into a Pinyin sequence and compared to a Pinyin input sequence. For another example, the context content may be converted to a Wubi sequence and compared to a Wubi input sequence. It should be noted that, when the context contents comprise an image, an image recognition technology may be employed to extract texts contained in the image as part of the context contents and converted to coded sequence under the same coding scheme as the input sequence for comparison.

In step 204, the content corresponding to a subsequence of the converted sequence for the context contents that matches or closely matches the input sequence are added to a vocabulary bank of the input program and displayed as candidate input symbols or phrases. Specifically, if a subsequence of the sequence for the converted context contents matches or closely matches the input sequence, the content corresponding to the matched subsequence is determined to be associated with the input sequence and is added to the vocabulary bank of the input program, and displayed as candidate input symbols or phrases. Alternatively, the content corresponding to the matched subsequence may be displayed as candidate input symbols or phrases without being added to the vocabulary bank of the input program.

It should be noted that the above steps 201 and 202 are not necessarily sequential. The context contents may be obtained first, and then the input coded sequence is obtained.

Similar to the embodiment of FIG. 1A, after the communication path is established between the application and the input program, the steps above may be performed by either the application or the input program.

Figure 3:
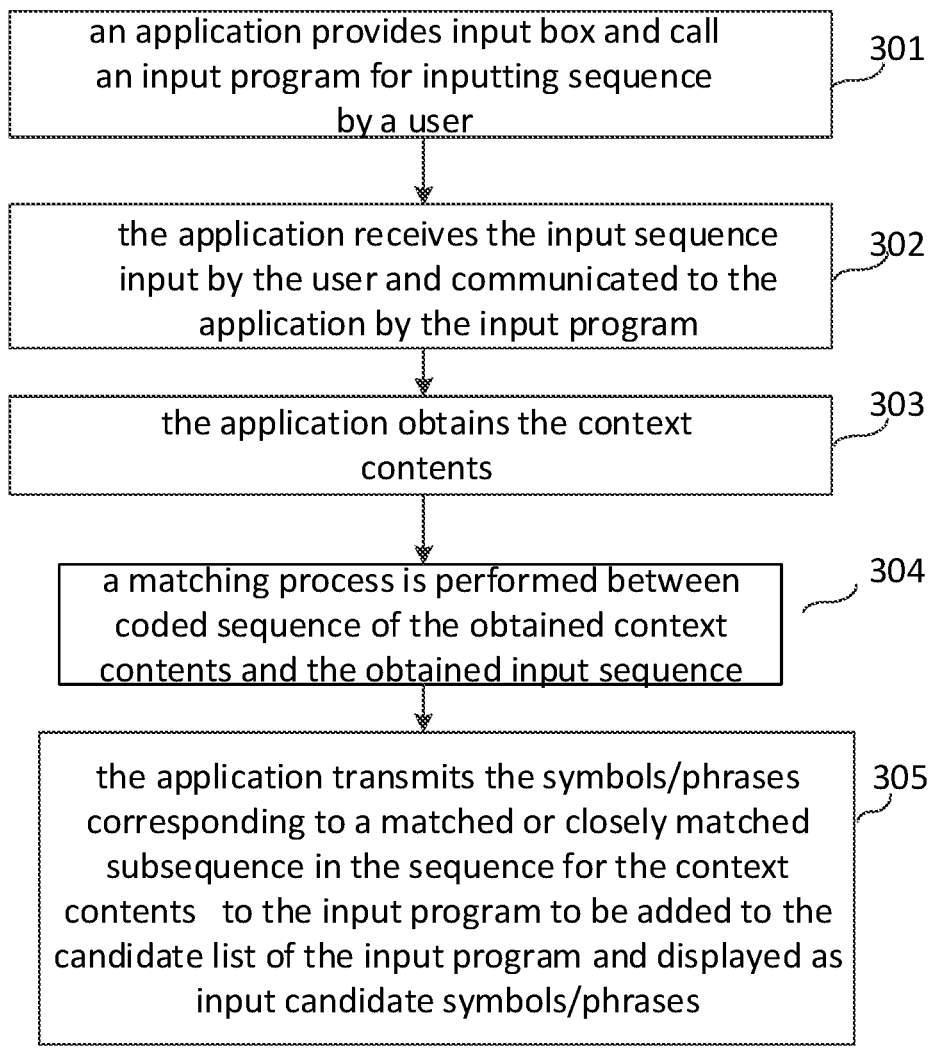
FIG. 3 is a flow diagram illustrating another method for inputting coded content according to an exemplary embodiment.

FIG. 3 is a flow diagram illustrating another method for inputting coded sequence according to an exemplary embodiment. In this embodiment, the communication path between an input program and the current application is established through a system inter-process interface. Based on, for example, a Pinyin sequence that a user entered into the input program, the application searches its current context for a symbol or phrase that corresponds to the input Pinyin and adds the symbol or phrase as a candidate in the input program. The method of FIG. 3 may be used in a terminal such as a mobile phone or a laptop computer.

In step 301, an application provides input box and calls or invokes the input program for a user to input coded sequences. Specifically, when using an application, a user may click or select an input box of the application if he or she wants to input contents. For example, the user may use a search box in a browser's search page to input search terms in Chinese. The application detects that the input box content is clicked and calls an input program via, for example, an inter-process interface provided by the operating system of the terminal. The user then types the coded sequence of intended content under an input coding scheme such as Pinyin or Wubi into the input program. The input program may provide a list of candidate symbols or phrases from its vocabulary bank for the user to select. The input program may control the order of the candidate symbols or phrases. For example, the input program may show candidate symbols or phrases in an order based on use frequency. The user may select the intended symbols or phrases from the list using, for example, a mouse. Once the selection is made, the selected symbols or phrases may appear in the search box on the browser search page.

Further, when the Pinyin or Wubi sequence is typed in the input program, the input program may first identify the application that the user is using currently. The input program may transmit the coded input sequence to the application through the system interface (such as the inter-process communication interface provided by the operating system) and consequently in step 302, the application receives the coded input sequence by the user from the input program. For example, a user may input a Pinyin sequence "hange" (which appears to contain two Chinese symbols and without context, it is difficult to guess what the intended phrase is) in the input program and the input program may then transmit "hange" to the application. It should be noted that the Pinyin input scheme is used as an illustrative example. The method steps described herein are not limited to Pinyin input schemes. The principles discussed herein are applicable to other input schemes such as Wubi or Stroke count.

In step 303, the application obtains its context contents. Specifically, upon receiving the pinyin sequence from the input program, the application acquires the context contents displayed in the current application interface, including text contents and image contents. In one implementation, only the context contents displayed in the current interface is acquired, because the Pinyin input by the user may be most likely closely related to the contents of the texts and/or images displayed in the current application interface. But in order to search more contents, context contents of adjacent application interface (in time) may also be obtained. Alternatively, context contents of all application interfaces available may be obtained. Content context outside the currently or previously displayed interface of the application may be obtained, as discussed above in FIGS. 1A and 2. It should be noted that, if more contents are to be searched, the time it takes for searching will be longer, leading to delay in displaying to the user the candidate symbols and phrases. Therefore, the range and amount of the context contents to be acquired may be set as needed or dynamically. Further, there may be other applications running for the work that user is performing. The contents of those applications may be included in the search for candidate symbols and phrases as well. In that case, the contents of the interfaces for the other applications may be communicated to the current application via the inter-process communication mechanism discussed above.

In step 304, a comparing and matching process is preformed to the context contents and the input coded sequence. If the context contents comprise an image content, an image recognition technology may be employed to extract the texts contained in the image. The context contents in text form may be converted to a sequence according to the input coding scheme. For example, if the input content is Pinyin, the application may convert the context contents into a Pinyin sequence. The converted sequence may be compared to the input sequence transmitted by the input program. If the input Pinyin sequence has an exact match or close match to the converted sequence or subsequence of context contents, the symbols or phrases in the context contents corresponding to the matched subsequence may be saved to a "matched symbol/phrase list". As another example, if the input content is in the form of a Wubi sequence, then the context contents are converted into a Wubi sequence which is compared to the Wubi input sequence transmitted by the input program. If the input Wubi sequence is identical or similar to the converted Wubi sequence of a subsequence of the context contents, the symbols and phrases in the context contents corresponding to the matched subsequence may be saved to the "matched symbol/phrase list". Other input schemes may be treated similarly.

It is possible that the input sequence matches or closed matches multiple subsequences of the sequence of context contents where each subsequence corresponds to different symbols/phrases in the context contents. For example, if the Pinyin input sequence is "hange", corresponding symbols may be the Chinese equivalent of "brother Han" or "welding" and others because "brother Han" and "welding" have the same Pinyin sequence of "hange". Therefore both matches are considered to be successfully matches and both "brother Han" and "welding" symbols are saved to the "matched symbol/phrase list". The user may be prompt to choose with one of the symbols/phrases is intended.

In step 305, the application transmits the symbols or phrases that are successfully found to the input program to be added to the list of candidate symbols/phrases and to be displayed as input candidate symbols/phrases for the current input task. In one implementation, the application sends its "matched symbols/phrases list" after successfully matching to the input program. Upon receiving the matched symbols/phrases list from the application, the input program may add all symbols/phrases in the matched symbols/phrases list to its "candidate symbols/phrases list". Because these symbols and phrases are recent matches, the input program may attach priority to them and place them on the top of the candidate symbols/phrases list for their corresponding Pinyin or Wubi sequence. That way, these symbols/phrases may be displayed as the top choice for the user the next time the corresponding sequence is typed.

In one implementation for FIG. 3, the application obtains the input coded sequence transmitted by the input program and obtains the context contents of itself for finding an exact match or close match. In another implementation, after establishing a connection to the application, the input program may obtain the context contents transmitted by the application. The input program rather than the application may convert the context contents into a sequence under the same input coding scheme as the input coded sequence. And the input program rather than the application further perform the comparison and matching. Alternatively, the application may perform the conversion of the context contents into a sequence under the same input coding scheme as the input coded sequence and transmit the converted sequence to the input program which performs the comparison and matching. In this way, successful matching will be performed by the input program and the list of candidate symbols or phrases will be added to the front or top of the vocabulary bank of the input program directly.

Thus, in the embodiment of FIG. 3, a connection between the input program and the application may be established via some inter-process interface of the operating system. The application may obtain the content sequence entered to an input box by a user from the input program, and may obtain the context contents from one or more interfaces of the application. After the context contents are converted to a sequence under the same input coding scheme as the input sequence, the converted sequence for the context contents may be compared and matched with the input sequence. If exact or close matches are found, then the matching is considered successful and the symbols/phrases corresponding to the matched subsequence of the sequence for the converted context contents will be saved to a matched symbols/phrases list and sent to the input program. The input program may then add the matched symbols/phrases to its vocabulary bank and displays the matched symbols/phrases as candidate input symbols/phrases. In this way, contents that a user intends to enter may be listed to the user in a quicker manner, providing enhanced user experience. Furthermore, the implementation may support input schemes other than Pinyin or Wubi under principles similar to those described above. In addition, the input program or the application may flexibly and adaptively decide the range of context contents to be acquired for comparison and matching with the input sequence.

Figure 4:
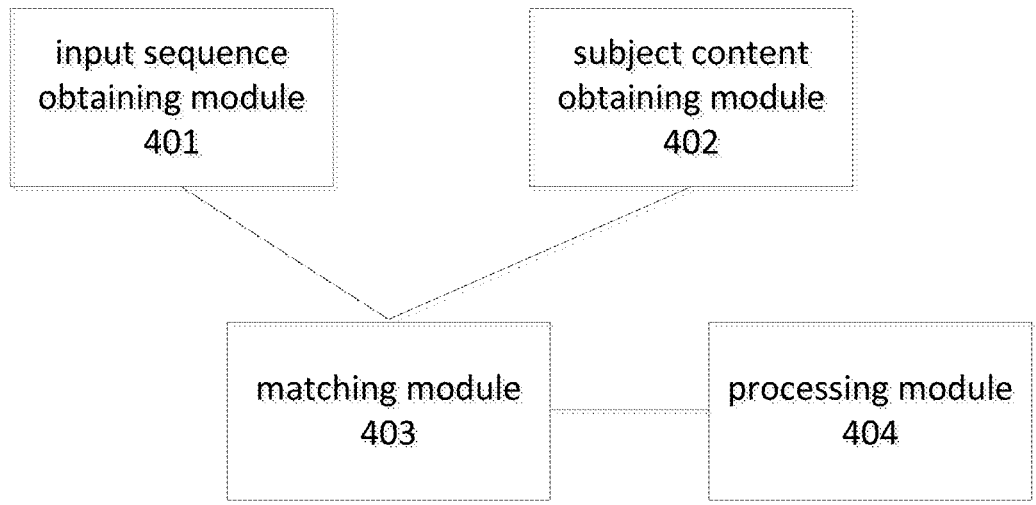
FIG. 4 is a block diagram illustrating an apparatus for inputting coded content according to an exemplary embodiment.

Corresponding to the method implementation discussed above, the present disclosure further provides embodiments of an input processing apparatus and a corresponding terminal. FIG. 4 is a block diagram illustrating an apparatus for inputting coded symbols/phrases according to an exemplary embodiment. The apparatus comprises: an input sequence obtaining module 401, a subject content obtaining module 402, a matching module 403, and a processing module 404. The input sequence obtaining module 401 is for obtaining input sequences. The subject content obtaining module 402 is for obtaining context contents. The matching module 403 is for comparing and matching the input sequence obtained by the input sequence obtaining module 401 and the context content obtained by the subject content obtaining module 402. The processing module 404 is for displaying the associated contents in the context contents as candidate input symbols/phrases when matches or close matches are found. Thus, in the embodiment of FIG. 4, a context content in context contents are compared and matched with an input content under the same input coding scheme. If matches or close matches are found, content in the context contents that is matched, or closely matched with the input sequence will displayed as candidate input symbols/phrases. In such a way, content that a user intends to enter may be provided to the user in a quick manner, providing improved user experience.

Figure 5:
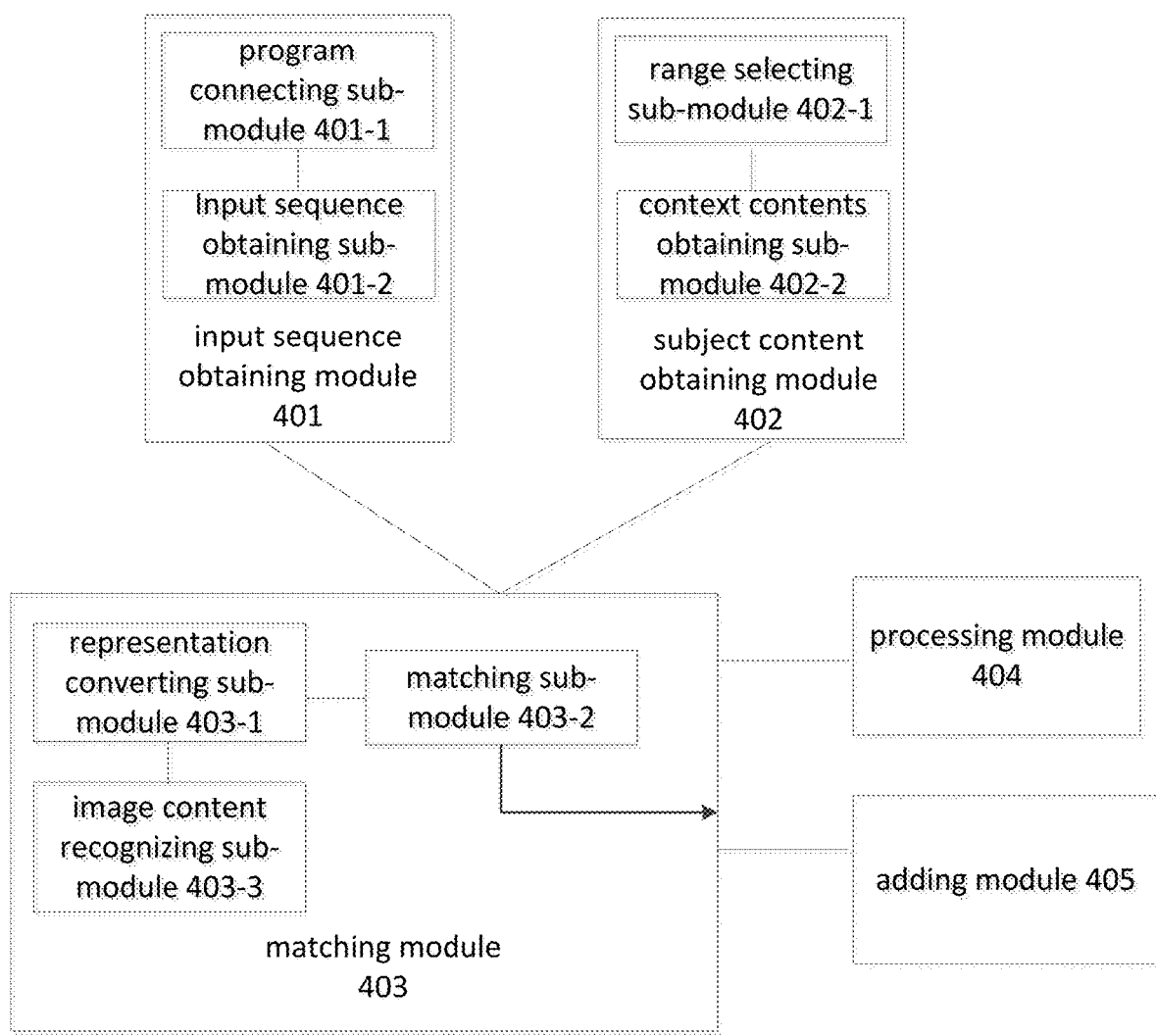
FIG. 5 is a block diagram illustrating another apparatus for inputting coded content processing according to an exemplary embodiment.

FIG. 5 is a block diagram illustrating another apparatus for inputting symbols/phrases according to an exemplary embodiment. The input processing apparatus comprises: an input sequence obtaining module 401, a subject content obtaining module 402, a matching module 403, a processing module 404, and an adding module 405. Descriptions of functions of the input sequence obtaining module 401, the subject content obtaining module 402, the matching module 403, and the processing module 404 are discussed above for FIG. 4. All descriptions therein apply to FIG. 5. The adding module 405 of FIG. 5 is for adding the matched contents in the context contents to a vocabulary bank of the input program.

The input sequence obtaining module 401 of FIG. 5 may comprise a program connecting sub-module 401-1, and an input obtaining sub-module 401-2. The program connecting sub-module 401-1 is for establishing a connection with the input program by the application via, for example, an inter-process communication interface provided by the operating system. The input obtaining sub-module 401-2 is for obtaining content sequence entered into the input program which the program connecting sub-module 401-1 is in communication with.

The subject content obtaining module 402 FIG. 5 may comprise a range selecting sub-module 402-1, and a context content obtaining sub-module 402-2. The range selecting sub-module 402-1 is for determining a range and amount of the context contents of the application to acquire. The range may be limited to the currently displayed interface of the application or may further include adjacent interfaces of the application (e.g., previous interface of the application that the user viewed), or other viewed interfaces of the application previously displayed to the user. The range may include contents outside the currently or previously displayed interface of the application, as discussed above. The context contents obtaining sub-module 402-2 is for obtaining context contents of the application according to the range determined by the range selecting sub-module 402-1.

The matching module 403 of FIG. 5 may comprise a representation converting sub-module 403-1, and a matching sub-module 403-2. The representation converting sub-module 403-1 is for converting contents in the context content to a sequence under the same input rule as the input sequence. The matching sub-module 403-2 is for comparing and matching the sequence of the converted context contents with the input sequence. The matching submodule 403-2 determines whether matches or close matches between the input sequence and subsequences of the converted sequence of the context contents in the context contents are found. The matching module 403 may further comprise an image content recognizing sub-module 403-3. The image content recognizing sub-module 403-3 is for performing an image recognition technology to recognize texts contained in the image as a part of the context contents when the application interfaces within the range determined by the range selecting sub-module 402-1 comprise image contents. The representation converting sub-module 403-1 converts text contents in the context contents recognized by the image content recognizing sub-module 403-3 to the same input coding scheme as the input context. As an example, when the input rule for the input sequence is Pinyin, the representation converting submodule 403-1 convert the context contents to a sequence of Pinyin and the matching sub-module 403-2 compares and matches the input Pinyin sequence with Pinyin subsequences of the converted context contents. As another example, when the input rule for the input sequence is Wubi, the representation converting submodule 403-1 convert the context contents to a sequence of Wubi and the matching sub-module 403-2 compares and matches the input Wubi sequence with Wubi subsequences of the converted context contents. Similarly, when the input rule for the input sequence is stroke count, the representation converting sub-module 403-1 convert the context contents to a sequence of stroke count and the matching sub-module 403-2 compares and matches the input stroke count sequence with stroke count subsequences of the converted context contents.

Thus, in the embodiment of FIG. 5, a range of context contents of the application and input sequence of a certain input schemes may be obtained. They may be compared and matched after the context contents are converted to a sequence under the same input coding scheme as the input sequence. When matches or close matches are found, content in the context contents associated with the matched sequence may be added to the vocabulary bank of the input program and may be displayed by the input program as candidate input symbols/phrases; so that symbols or phrases that a user wants to enter may be provided to the user in a quick manner, providing enhanced user experience.

With respect to the apparatus embodiments above, since they substantially correspond to the method embodiments, the relevant part of the description for the method embodiments applies to the apparatus embodiments. In addition, the above-described apparatus embodiments are merely illustrative. The units (modules and submodules) described as separate components may be or may not be physically separated, components shown as a unit may be or may not be a physical unit. That is, they may be located in one place, or may be distributed on multiple network units. Part or all of the modules may be selected to achieve purposes of the present disclosure according to actual needs.

Figure 6:
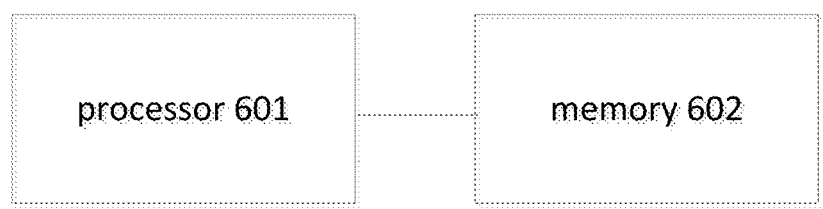
FIG. 6 is a block diagram illustrating a terminal device for inputting coded content according to an exemplary embodiment.

FIG. 6 is a block diagram illustrating a terminal device according to an exemplary embodiment. The terminal device comprises: a processor 601 and a memory 602 for storing processor-executable instructions. The processor 601 is configured to obtain input sequence from a user and context contents from an application running on the terminal device. The processor is further configured to compare and match the input context sequence and the context contents converted to a sequence under the same input coding scheme. The processor is further configured to display the content (symbols/phrases) associated with the matched or closely matched subsequence of the converted sequence of the context contents as candidate input symbols/phrases.

Figure 7:
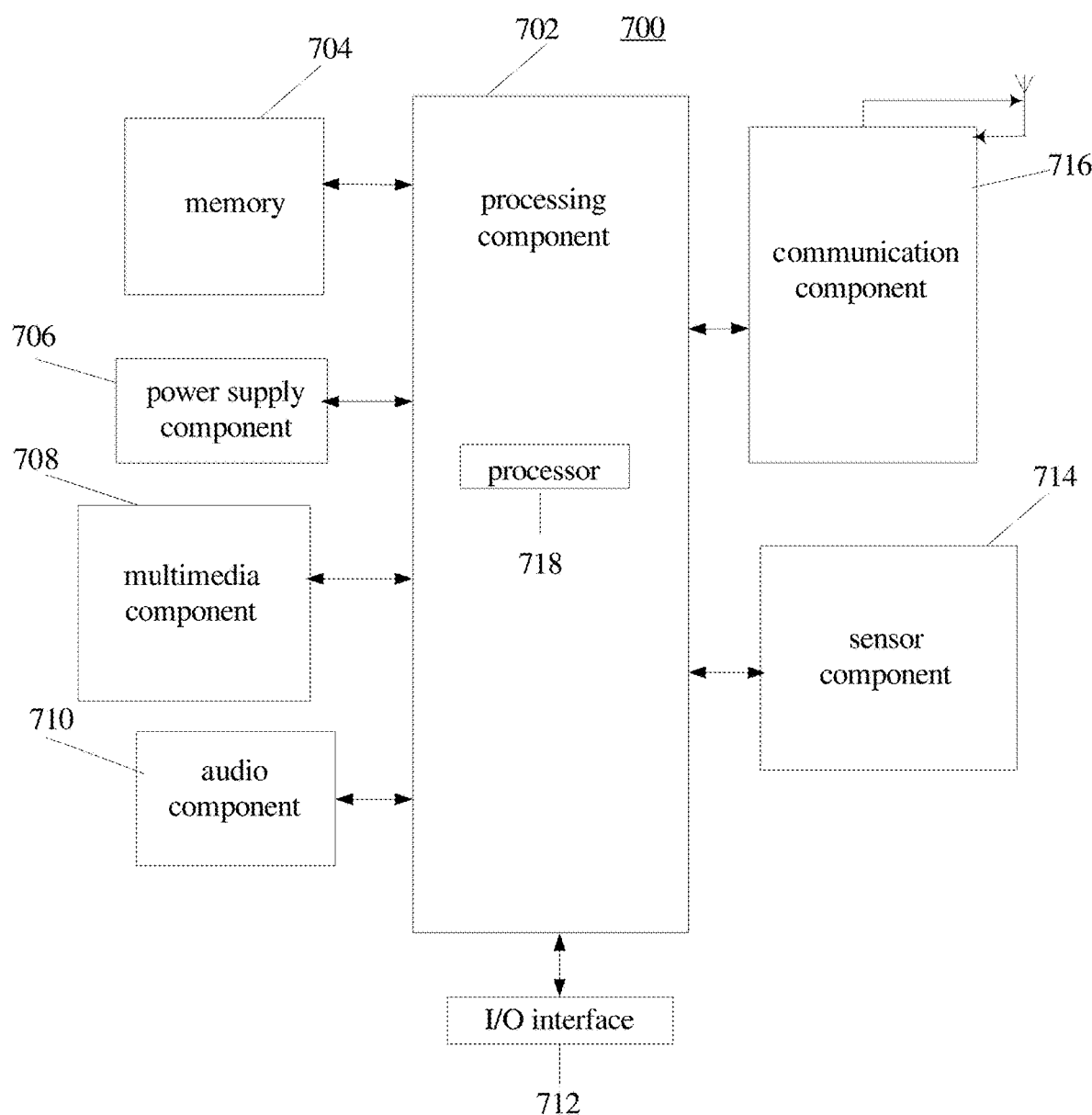
FIG. 7 is a block diagram illustrating a device for inputting coded content according to an exemplary embodiment.

FIG. 7 is a structure block diagram illustrating a device according to another exemplary embodiment. The device 700 may be a mobile phone, a computer, a digital broadcast terminal, a messaging device, a gaming console, a tablet, a medical device, exercise equipment, a personal digital assistant, and the like.

Referring to FIG. 7, the apparatus 700 may comprise one or more of the following components: a processing component 702, a memory 704, a power supply component 706, a multimedia component 708, an audio component 710, an input/output (I/O) interface 712, a sensor component 714, and a communication component 716.

The processing component 702 controls overall operations of the apparatus 700, such as the operations associated with display, telephone calls, data communications, camera operations, and recording operations. The processing component 702 may comprise one or more processors 718 to execute instructions to perform all or part of the steps in the above described methods. Moreover, the processing component 702 may comprise one or more modules which facilitate the interaction between the processing component 702 and other components. For instance, the processing component 702 may comprise a multimedia module to facilitate the interaction between the multimedia component 708 and the processing component 702.

The memory 704 is configured to store various types of data to support the operation of the apparatus 700. Examples of such data comprise instructions for any applications or methods operated on the apparatus 700, contact data, phonebook data, messages, images, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 706 provides power to various components of the apparatus 700. The power component 706 may comprise a power management system, one or more power sources, and any other components associated with the generation, management, and distribution of power for the apparatus 700.

The multimedia component 708 comprises a display screen providing an output interface between the apparatus 700 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 comprises a front camera and/or a rear camera. The front camera and the rear camera may receive external multimedia data while the apparatus 700 is in an operation mode, such as a photographing mode or a video mode. Each of the front camera and the rear camera may be a fixed optical lens system or capable of optical focusing and zooming.

The audio component 710 is configured to output and/or input audio signals. For example, the audio component 710 may comprise a microphone (MIC) configured to receive an external audio signal when the apparatus 700 is in an operation mode, such as a call mode, a recording mode, and a voice recognition mode. The received audio signal may be further stored in the memory 704 or transmitted via the communication component 716. In some embodiments, the audio component 710 further comprises a speaker to output audio signals.

The I/O interface 712 provides an interface between the processing component 702 and peripheral interface modules, the peripheral interface modules being, for example, a keyboard, a click wheel, buttons, and the like. The buttons may comprise, but are not limited to: a home button, a volume button, a starting button, and a locking button.

The sensor component 714 comprises one or more sensors to provide status assessments of various aspects of the apparatus 700. For instance, the sensor component 714 may detect an open/closed status of the apparatus 700, relative positioning of components (e.g., the display and the keypad of the apparatus 700), a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 714 may comprise a proximity sensor configured to detect the presence of a nearby object without any physical contact. The sensor component 714 may also comprise a light sensor, such as a CMOS or CCD image sensor, for use in imaging applications. In some embodiments, the sensor component 714 may also comprise an accelerometer sensor, a gyroscope sensor, a magnetic sensor, a pressure sensor, or a temperature sensor or thermometer.

The communication component 716 is configured to facilitate communication, wired or wirelessly, between the apparatus 700 and other devices. The apparatus 700 can access a wireless network based on a communication standard, such as Wi-Fi, 2G, 3G, LTE, or 4G cellular technologies, or a combination thereof. In an exemplary embodiment, the communication component 716 receives a broadcast signal or broadcast associated information from an external broadcast management system via a broadcast channel. In an exemplary embodiment, the communication component 716 further comprises a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an exemplary embodiment, there is also provided a non-transitory computer-readable storage medium including instructions, such as comprised in the memory 704, executable by the processor 718 in the apparatus 700, for performing the above-described methods. For example, the non-transitory computer-readable storage medium may be a ROM, a RAM, a CD-ROM, a magnetic tape, a floppy disc, an optical data storage device, and the like. For example, a non-transitory computer-readable storage medium may include instructions therein. The instructions, when executed by a processor of a terminal, enable the terminal to obtain input sequence, obtain context contents, compare and match the input context sequence and the context contents converted to a sequence under the same input coding scheme of the input sequence, and display the associated content of matched or closely matched subsequence of the context contents as candidate input symbols/phrases.

Each module or unit discussed above for FIG. 4-9, such as the input sequence obtaining module, the subject content obtaining module, the matching module, the processing module, the program connecting sub-module, the input sequence obtaining sub-module, the range selecting sub-module, the context contents obtaining sub-module, the representation converting sub-module, the image content recognizing sub-module, the matching sub-module, and the adding module may take the form of a packaged functional hardware unit designed for use with other components, a portion of a program code (e.g., software or firmware) executable by the processor 720 or the processing circuitry that usually performs a particular function of related functions, or a self-contained hardware or software component that interfaces with a larger system, for example.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure.

It will be appreciated that the inventive concept is not limited to the exact construction that has been described above and illustrated in the accompanying drawings, and that various modifications and changes can be made without departing from the scope thereof. It is intended that the scope of the disclosure be limited by the appended claims only.

What is claimed is:

1. A method for processing input from a user of an application in an electronic device, comprising:
obtaining a first sequence of one or more key presses typed by a user of an application in an electronic device, via an input program running on the electronic device, as a coded form of an intended textual input content according to an input coding scheme;
selecting, based on the application, contexts from a plurality of contexts, wherein when the application is a text editing tool and the user is editing a document using the application, the selected contexts include all pages of the document;
acquiring, by the application or the input program, context contents from the selected contexts;
obtaining textual content of the acquired context contents;
converting, according to the input coding scheme, the obtained textual content to a second sequence, wherein the second sequence is in a coded form of the obtained textual content;
identifying a subsequence in the second sequence that matches or closely matches the first sequence;
identifying, according to the input coding scheme, at least a portion of the obtained textual content that corresponds to the identified subsequence in the second sequence, wherein the identified at least a portion of the obtained textual content is in a textual form of the identified subsequence in the second sequence; and
displaying on a display screen of the electronic device the identified at least a portion of the obtained textual content as a candidate for the intended textual input content.

2. The method of claim 1,
wherein obtaining the first sequence of one or more key presses comprises obtaining by the application the first sequence of one or more key presses typed by the user of the application in the electronic device as the coded form of the intended textual input content according to the input coding scheme transmitted from the input program running on the electronic device.

3. The method of claim 1, further comprising:
adding the identified at least a portion of the obtained textual content to a vocabulary bank of the input program.

4. The method of claim 1, wherein the plurality of contexts comprise one or more of a currently displayed interface of the application, interfaces of the application displayed prior to the current interface, contents opened by the application, or other opened applications.

5. The method of claim 1,
wherein obtaining the first sequence of one or more key presses comprises obtaining, by the input program running on the electronic device, the first sequence of one or more key presses typed by the user of the application in the electronic device as the coded form of the intended textual input content according to the input coding scheme.

6. The method of claim 1, wherein obtaining the textual content of the acquired context contents comprises:
obtaining text from the acquired context contents; and
when the acquired context contents include one or more images, extracting textual content from the one or more images by image recognition.

7. The method of claim 1, wherein the intended textual input content comprises Chinese text and the input coding scheme is Pinyin, Wubi, or stroke count.

8. The method of claim 6, wherein the intended textual input content comprises Chinese text and the input coding scheme is Pinyin, Wubi, or stroke count.

9. An electronic device, comprising:
a processor; and
a memory for storing processor-executable instructions;
wherein the processor is configured to:
obtain a first sequence of one or more key presses typed by a user of an application in the electronic device, via an input program running on the electronic device, as a coded form of an intended textual input content according to an input coding scheme;
select, based on the application, contexts from a plurality of contexts, wherein when the application is a text editing tool and the user is editing a document using the application, the selected contexts include all pages of the document;
acquire, by the application or the input program, context contents from the selected contexts;
obtain textual content of the acquired context contents;
convert, according to the input coding scheme, the obtained textual content to a second sequence, wherein the second sequence is in a coded form of the obtained textual content;
identify a subsequence in the second sequence that matches or closely matches the first sequence;
identify, according to the input coding scheme, at least a portion of the obtained textual content that corresponds to the identified subsequence in the second sequence, wherein the identified at least a portion of the obtained textual content is in a textual form of the identified subsequence in the second sequence; and
display on a display screen of the electronic device the identified at least a portion of the obtained textual content as a candidate for the intended textual input content.

10. The electronic device of claim 9, the processor is further configured to:
add the identified at least a portion of the obtained textual content to a vocabulary bank of the input program.

11. The electronic device of claim 9, wherein the processor is further configured to establish a communication path between the input program and the application.

12. The electronic device of claim 9, wherein the plurality of contexts comprise one or more of a currently displayed interface of the application, interfaces of the application displayed previously preceding the current interface, contents opened by the application, or other opened applications.

13. The electronic device of claim 9, wherein, to obtain the textual content of the acquired context contents, the processor is configured to:
obtain text from the acquired context contents; and
when the acquired context contents include one or more images, extract textual content from the one or more images by image recognition.

14. A non-transitory computer-readable storage medium having instructions stored therein, the instructions, when executed by one or more processors of an electronic device, cause the electronic device to:
obtain a first sequence of one or more key presses typed by a user of an application in the electronic device, via an input program running on the electronic device, as a coded form of an intended textual input content according to an input coding scheme;
select, based on the application, contexts from a plurality of contexts, wherein when the application is a text editing tool and the user is editing a document using the application, the selected contexts include all pages of the document;

acquire, by the application or the input program, context contents from the selected contexts;

obtain textual content of the acquired context contents;

convert, according to the input coding scheme, the obtained textual content to a second sequence, wherein the second sequence is in a coded form of the obtained textual content;

identify a subsequence in the second sequence that matches or closely matches the first sequence;

identify, according to the input coding scheme, at least a portion of the obtained textual content that corresponds to the identified subsequence in the second sequence, wherein the identified at least a portion of the obtained textual content is in a textual form of the identified subsequence in the second sequence; and display on a display screen of the electronic device the identified at least a portion of the obtained textual content as a candidate for the intended textual input content.

\* \* \* \* \*